US008589612B2

(12) United States Patent
Yamada et al.

(10) Patent No.: US 8,589,612 B2
(45) Date of Patent: Nov. 19, 2013

(54) COMPUTER SYSTEM INCLUDING AN INTERRUPT CONTROLLER

(75) Inventors: Hiromichi Yamada, Hitachi (JP);
Kotaro Shimamura, Mito (JP);
Nobuyasu Kanekawa, Hitachi (JP);
Yuichi Ishiguro, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 170 days.

(21) Appl. No.: 13/106,788

(22) Filed: May 12, 2011

(65) Prior Publication Data

US 2011/0283033 A1    Nov. 17, 2011

(30) Foreign Application Priority Data

May 12, 2010    (JP) .................................. 2010-109870

(51) Int. Cl.
*G06F 13/24*    (2006.01)
(52) U.S. Cl.
CPC ...................................... *G06F 13/24* (2013.01)
USPC ............................ 710/267; 710/261; 710/262
(58) Field of Classification Search
USPC ......................................................... 710/261
See application file for complete search history.

(56) References Cited

U.S. PATENT DOCUMENTS

| 5,568,649 | A  | * | 10/1996 | MacDonald et al. | ............. 710/48 |
| 5,613,126 | A  | * | 3/1997  | Schmidt | ......................... 710/260 |
| 5,701,496 | A  | * | 12/1997 | Nizar et al. | .................... 710/266 |
| 5,918,057 | A  | * | 6/1999  | Chou et al. | .................... 710/260 |
| 6,032,245 | A  | * | 2/2000  | Georgiou et al. | ................ 712/23 |
| 7,610,425 | B2 | * | 10/2009 | Solomita et al. | .............. 710/260 |
| 7,721,035 | B2 | * | 5/2010  | Utsumi | .......................... 710/268 |
| 7,805,555 | B2 | * | 9/2010  | Takata et al. | .................... 710/260 |
| 8,051,234 | B2 | * | 11/2011 | Takata et al. | .................... 710/268 |
| 8,239,600 | B2 | * | 8/2012  | Yamamoto et al. | ............ 710/264 |
| 2004/0068598 | A1 | * | 4/2004 | Sakugawa | ...................... 710/260 |
| 2006/0085582 | A1 | * | 4/2006 | Shikano et al. | ................ 710/260 |
| 2008/0172511 | A1 | * | 7/2008 | Takata et al. | .................... 710/260 |
| 2008/0244138 | A1 | * | 10/2008 | Terasawa | ....................... 710/264 |
| 2010/0088445 | A1 | * | 4/2010 | Yamamoto et al. | ............ 710/264 |
| 2010/0293314 | A1 | * | 11/2010 | Kataoka et al. | ................ 710/262 |
| 2011/0022759 | A1 | * | 1/2011 | Takata et al. | .................... 710/265 |
| 2011/0264837 | A1 | * | 10/2011 | Diaz et al. | ...................... 710/261 |

OTHER PUBLICATIONS

Thomas Kottke, "A Reconfigurable Generic Dual-Core Architecture" International Conference on Dependable Systems and Networks 2006, pp. 45-54.
Richard Emmerson, "Fault Tolerance Achieved in VLSI", IEEE Micro, Dec. 1984, pp. 34-43.

(Continued)

*Primary Examiner* — Ryan Stiglic
(74) *Attorney, Agent, or Firm* — Miles & Stockbridge P.C.

(57) ABSTRACT

A computer system which shortens standby time of CPUs and improves CPU processing efficiency of a performance mode upon switching from the performance mode (parallel operation) to a safety mode (master/checker operation) is provided. In a computer system including: at least two CPUs; a programmable interrupt controller for interrupting the CPUs; and a comparator for mutually comparing outputs of the CPUs, switching between the performance mode of executing mutually different processes by the CPUs, respectively, to improve performance and the safety mode of executing mutually the same processes by the CPUs and collating results by the comparator to detect failure can be carried out; CPUs to be interrupted can be set for each interrupt factor; and whether the performance mode is to be executed or the safety mode is to be executed can be set for each interrupt factor.

11 Claims, 20 Drawing Sheets

(56) References Cited

OTHER PUBLICATIONS

Cristian Constantinescu et al., "Dependability Benchmarking of Computing Systems" (Panel Statement), Proceedings of the 2005 International Conference on Dependable Systems and Networks (DSN05), Yokohama, Japan, 28-01 Jun. 2005, Piscataway, NJ, USA, IEEE, Jun. 28, 2005.

Extended European Search Report issued Nov. 5, 2012, in European Patent Application No. 11164649.3.

* cited by examiner

FIG. 2

| REGISTER NAME | BIT | | | |
|---|---|---|---|---|
| | 15~12 | 11~8 | 7~4 | 3~0 |
| IPR0 | E0 (EXTERNAL 0) | E1 (EXTERNAL 1) | E2 (EXTERNAL 2) | E3 (EXTERNAL 3) |
| IPR1 | PA (PERIPHERAL A) | PB (PERIPHERAL B) | PC (PERIPHERAL C) | PD (PERIPHERAL D) |
| IPR2 | PE (PERIPHERAL E) | PF (PERIPHERAL F) | PG (PERIPHERAL G) | PH (PERIPHERAL H) |
| IPR3 | PI (PERIPHERAL I) | PJ (PERIPHERAL J) | PK (PERIPHERAL K) | PL (PERIPHERAL L) |

FIG. 3

| REGISTER NAME | BIT | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| ICP0 | E0 | E1 | E2 | E3 | PA | PB | PC | PD | PE | PF | PG | PH | PI | PJ | PK | PL |
| ICP1 | E0 | E1 | E2 | E3 | PA | PB | PC | PD | PE | PF | PG | PH | PI | PJ | PK | PL |

FIG. 4

| REGISTER NAME | BIT | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| IMD | E0 | E1 | E2 | E3 | PA | PB | PC | PD | PE | PF | PG | PH | PI | PJ | PK | PL |

FIG. 6

| CASE | COMPARATOR OUTPUT | | MODE OF REQUEST | | INTERRUPT NUMBER | MASK | |
|---|---|---|---|---|---|---|---|
| | A | B | A | B | | A | B |
| 1 | 0 | 0 | — | — | — | 0 | 0 |
| 2 | 1 | 0 | INDIVIDUAL | — | — | 0 | 0 |
| 3 | 0 | 1 | — | INDIVIDUAL | — | 0 | 0 |
| 4 | 1 | 1 | INDIVIDUAL | INDIVIDUAL | — | 0 | 0 |
| 5 | 1 | 0 | SIMULTANEOUS | — | — | 1 | 0 |
| 6 | 0 | 1 | — | SIMULTANEOUS | — | 0 | 1 |
| 7 | 1 | 1 | INDIVIDUAL | SIMULTANEOUS | — | 0 | 1 |
| 8 | 1 | 1 | SIMULTANEOUS | INDIVIDUAL | — | 1 | 0 |
| 9 | 1 | 1 | SIMULTANEOUS | SIMULTANEOUS | A≠B | 1 | 1 |
| 10 | 1 | 1 | SIMULTANEOUS | SIMULTANEOUS | A=B | 0 | 0 |

FIG. 11

| CASE | MODE | COMPARATOR OUTPUT | | MODE OF REQUEST | | INTERRUPT NUMBER | MASK | | MODE SWITCHING |
|---|---|---|---|---|---|---|---|---|---|
| | | A | B | A | B | | A | B | |
| 1 | PERFORMANCE | 0 | 0 | — | — | — | 0 | 0 | 0 |
| 2 | PERFORMANCE | 1 | 0 | PERFORMANCE | — | — | 0 | 0 | 0 |
| 3 | PERFORMANCE | 0 | 1 | — | PERFORMANCE | — | 0 | 0 | 0 |
| 4 | PERFORMANCE | 1 | 1 | PERFORMANCE | PERFORMANCE | — | 0 | 0 | 0 |
| 5 | PERFORMANCE | 1 | 0 | SAFETY | — | — | 1 | 0 | 0 |
| 6 | PERFORMANCE | 0 | 1 | — | SAFETY | — | 0 | 1 | 0 |
| 7 | PERFORMANCE | 1 | 1 | PERFORMANCE | SAFETY | — | 0 | 1 | 0 |
| 8 | PERFORMANCE | 1 | 1 | SAFETY | PERFORMANCE | — | 1 | 0 | 0 |
| 9 | PERFORMANCE | 1 | 1 | SAFETY | SAFETY | A≠B | 1 | 1 | 0 |
| 10 | PERFORMANCE | 1 | 1 | SAFETY | SAFETY | A=B | 1 | 1 | 1 |
| 11 | SAFETY | 0 | 0 | — | — | — | 0 | 0 | 0 |
| 12 | SAFETY | 1 | 0 | PERFORMANCE | — | — | 1 | 0 | 1 |
| 13 | SAFETY | 0 | 1 | — | PERFORMANCE | — | 0 | 1 | 1 |
| 14 | SAFETY | 1 | 1 | PERFORMANCE | PERFORMANCE | — | 1 | 1 | 1 |
| 15 | SAFETY | 1 | 0 | SAFETY | — | — | 1 | 0 | 0 |
| 16 | SAFETY | 0 | 1 | — | SAFETY | — | 0 | 1 | 0 |
| 17 | SAFETY | 1 | 1 | PERFORMANCE | SAFETY | — | 1 | 1 | 1 |
| 18 | SAFETY | 1 | 1 | SAFETY | PERFORMANCE | — | 1 | 1 | 1 |
| 19 | SAFETY | 1 | 1 | SAFETY | SAFETY | A≠B | 1 | 1 | 0 |
| 20 | SAFETY | 1 | 1 | SAFETY | SAFETY | A=B | 0 | 0 | 0 |

FIG. 13

| REGISTER NAME | BIT | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| SR | | | | | | | | MC | 13 | 12 | 11 | 10 | | | | |

Fig. 14

The interrupt controller can set one or a plurality of CPUs to be interrupted for each interrupt factor. If the plurality of CPUs to be interrupted are set, there are two accepting methods of: accepting an interrupt in the order from the CPU which becomes capable of accepting the interrupt; and accepting interrupts at one time after all of the CPUs to be interrupted become acceptable.

Fig. 15

The interrupt controller can set one or a plurality of CPUs to be interrupted for each interrupt factor. If the plurality of CPUs to be interrupted are present, a mode of accepting an interrupt in the order from the CPU which becomes capable of accepting the interrupt; or a mode of accepting the interrupt at one time after all of the CPUs to be interrupted have become acceptable can be set.

Fig. 16

The interrupt controller can set one or a plurality of CPUs to be interrupted for each interrupt factor. If the plurality of CPUs to be interrupted are present, a mode of accepting an interrupt in the order from the CPU which becomes capable of accepting the interrupt; or a mode of accepting the interrupt at one time after all of the CPUs to be interrupted have become acceptable can be set per interrupt factor.

FIG. 17

The interrupt controller can set one or a plurality of CPUs to be interrupted for each interrupt factor. If the plurality of CPUs to be interrupted are set, there are two accepting methods of: accepting an interrupt in the order from the CPU which becomes capable of accepting the interrupt; and accepting interrupts at one time after all of the CPUs to be interrupted become acceptable.

The interrupt controller can set priority levels in a register per interrupt factor, and the CPU sets a level for masking interrupt requests in the register. If the priority level of the interrupt factor exceeds the level for masking interrupt requests of the CPU, the CPU becomes capable of accepting the interrupt.

FIG. 18

The interrupt controller can set one or a plurality of CPUs to be interrupted for each interrupt factor. If there are a plurality of CPUs to be interrupted, a mode of accepting an interrupt in the order from the CPU which becomes capable of accepting the interrupt; or a mode of accepting interrupts at one time after all of the CPUs to be interrupted become acceptable can be set.

The interrupt controller can set priority levels in a register per interrupt factor, and the CPU sets a level for masking interrupt requests in the register. If the priority level of the interrupt factor exceeds the level for masking interrupt requests of the CPU, the CPU becomes capable of accepting the interrupt.

FIG. 19

The interrupt controller can set one or a plurality of CPUs to be interrupted for each interrupt factor. If there are a plurality of CPUs to be interrupted, a mode of accepting an interrupt in the order from the CPU which becomes capable of accepting the interrupt; or a mode of accepting interrupts at one time after all of the CPUs to be interrupted become acceptable can be set per interrupt factor.

The interrupt controller can set priority levels in a register per interrupt factor, and the CPU sets a level for masking interrupt requests in the register. If the priority level of the interrupt factor exceeds the level for masking interrupt requests of the CPU, the CPU becomes capable of accepting the interrupt.

FIG. 20

This LSI has two CPUs, a programmable interrupt controller which interrupts the CPUs, and a comparator which compares outputs of the CPUs. Switching operation between a performance mode of executing mutually different processes by the CPUs to improve performance and a safety mode of executing the same process by the CPUs and detecting failure by collating results by the comparator can be carried out.

The interrupt controller can set one or two CPUs to be interrupted for each interrupt factor. Whether the process is to be executed in the performance mode or executed in the safety mode can be set for each interrupt factor. And, in a situation in which the mode of a selected interrupt factor is the performance mode when the mode currently being executed is the performance mode, the interrupt request is output to the CPU.

FIG. 21

This LSI has two CPUs, a programmable interrupt controller which interrupts the CPUs, and a comparator which compares outputs of the CPUs. Switching operation between a performance mode of executing mutually different processes by the CPUs to improve performance and a safety mode of executing the same process by the CPUs and detecting failure by collating results by a comparator can be carried out.

The interrupt controller can set one or two CPUs to be interrupted for each interrupt factor. Whether the process is to be executed in the performance mode or executed in the safety mode can be set for each interrupt factor. In a situation in which the mode of a selected interrupt factor is the safety mode when the mode currently being executed is the performance mode, the interrupt request is prevented from being output to the CPU. And, when all of the CPUs to be interrupted become acceptable, the processes of the CPUs are stopped, the operating mode is switched from the performance mode to the safety mode, and interrupt requests are output to the CPUs.

FIG. 22

This LSI has two CPUs, a programmable interrupt controller which interrupts the CPUs, and a comparator which compares the outputs of the CPUs. Switching operation between a performance mode of executing mutually different processes by the CPUs to improve performance and a safety mode of executing the same process by the CPUs and detecting failure by collating the results by a comparator can be carried out.

The interrupt controller can set one or two CPUs to be interrupted for each interrupt factor. Whether the process is to be executed in the performance mode or executed in the safety mode can be set for each interrupt factor. In a situation in which the mode of a selected interrupt factor is the performance mode when the mode currently being executed is the safety mode, the interrupt request is prevented from being output to the CPU. And, when the CPUs to be interrupted become acceptable, the processes of the CPUs are stopped, the operating mode is switched from the safety mode to the performance mode, and interrupt requests are output to the CPUs.

FIG. 23

This LSI has two CPUs, a programmable interrupt controller which interrupts the CPUs, and a comparator which compares the outputs of the CPUs. Switching operation between a performance mode of executing mutually different processes by the CPUs to improve performance and a safety mode of executing the same process by the CPUs and detecting failure by collating the results by a comparator can be carried out.

The interrupt controller can set one or two CPUs to be interrupted for each interrupt factor. Whether the process is to be executed in the performance mode or executed in the safety mode can be set for each interrupt factor. In a situation in which the mode of a selected interrupt factor is the safety mode when the mode currently being executed is the safety mode, the interrupt request is output to the CPUs if all of the CPUs to be interrupted are acceptable; in other situations, the interrupt request is not output.

FIG. 24

This LSI has two CPUs, a programmable interrupt controller which interrupts the CPUs, and a comparator which compares the outputs of the CPUs. Switching operation between a performance mode of executing mutually different processes by the CPUs to improve performance and a safety mode of executing the same process by the CPUs and detecting failure by collating the results by a comparator can be carried out.

The interrupt controller can set one or two CPUs to be interrupted for each interrupt factor. Whether the process is to be executed in the performance mode or executed in the safety mode can be set for each interrupt factor. In a situation in which the mode of a selected interrupt factor is the performance mode when the mode currently being executed is the performance mode, the interrupt request is output to the CPU.

The interrupt controller can set a priority level for each interrupt factor in a register, and the CPU sets a level for masking the interrupt request in the register. When the priority level of the interrupt factor exceeds the level for masking interrupt request mask of the CPU, the CPU becomes capable of accepting the interrupt.

FIG. 25

This LSI has two CPUs, a programmable interrupt controller which interrupts the CPUs, and a comparator which compares the outputs of the CPUs. Switching operation between a performance mode of executing mutually different processes by the CPUs to improve performance and a safety mode of executing the same process by the CPUs and detecting failure by collating the results by a comparator can be carried out.

The interrupt controller can set one or two CPUs to be interrupted for each interrupt factor. Whether the process is to be executed in the performance mode or executed in the safety mode can be set for each interrupt factor. In a situation in which the mode of a selected interrupt factor is the safety mode when the mode currently being executed is the performance mode, the interrupt request is prevented from being output to the CPU. And, when all of the CPUs to be interrupted become acceptable, the processes of the CPUs are stopped, the operating mode is switched from the performance mode to the safety mode, and interrupt requests are output to the CPUs.

The interrupt controller can set a priority level for each interrupt factor in a register, and the CPU sets a level for masking the interrupt request in the register. When a priority level of the interrupt factor exceeds the level for masking interrupt request of the CPU, the CPU becomes capable of accepting the interrupt.

FIG. 26

This LSI has two CPUs, a programmable interrupt controller which interrupts the CPUs, and a comparator which compares the outputs of the CPUs. Switching operation between a performance mode of executing mutually different processes by the CPUs to improve performance and a safety mode of executing the same process by the CPUs and detecting failure by collating the results by a comparator can be carried out.

The interrupt controller can set one or two CPUs to be interrupted for each interrupt factor. Whether the process is to be executed in the performance mode or executed in the safety mode can be set for each interrupt factor. In a situation in which the mode of a selected interrupt factor is the performance mode when the mode currently being executed is the safety mode, the interrupt request is prevented from being output to the CPU. And, when the CPUs to be interrupted become acceptable, the processes of the CPUs are stopped, the operating mode is switched from the performance mode to the safety mode, and interrupt requests are output to the CPUs.

The interrupt controller can set a priority level for each interrupt factor in a register, and the CPU sets a level for masking the interrupt request in the register. When the priority level of the interrupt factor exceeds the level for masking interrupt request of the CPU, the CPU becomes capable of accepting the interrupt.

FIG. 27

This LSI has two CPUs, a programmable interrupt controller which interrupts the CPUs, and a comparator which compares the outputs of the CPUs. Switching operation between a performance mode of executing mutually different processes by the CPUs to improve performance and a safety mode of executing the same process by the CPUs and detecting failure by collating the results by a comparator can be carried out.

The CPU has a mode switching bit indicating whether mode switching has been carried out or not in a status register. When the mode switching is carried out, a value indicating that the mode switching has been carried out is set. When an interrupt is accepted, a value indicating that the mode switching has not been carried out is set. When recovered from the interrupt, if the mode switching bit is the value indicating that the mode switching has been carried out, mode switching is executed.

COMPUTER SYSTEM INCLUDING AN INTERRUPT CONTROLLER

CROSS-REFERENCE TO RELATED APPLICATION

The present application claims priority from Japanese Patent Application No. 2010-109870 filed on May 12, 2010, the content of which is hereby incorporated by reference into this application.

TECHNICAL FIELD OF THE INVENTION

The present invention relates to a computer system such as a micro controller having a plurality of CPUs and relates to a technique effectively applied to, for example, a control system of an automobile.

BACKGROUND OF THE INVENTION

A microcontroller (hereinafter, also simply abbreviated as MCU) is a semiconductor integrated circuit that is embedded in equipment such as a home electric appliance, audio-visual equipment, mobile phone, automobile, industrial machine, or the like and carries out processings in accordance with a program stored in a memory, thereby controlling corresponding equipment.

In an automobile, a failure of a control unit may lead to an accident; therefore, parts including the MCU are required to have high reliability and are designed to have a safety function detecting a failure upon occurrence of the failure to avoid a dangerous state of the automobile. The MCU is not only required to diagnose sensors and actuators and detect failures thereof, but also required to detect failures of the MCU per se.

There are various methods for the MCU failure detection. One of them duplexes CPUs, causes them to carry out the same processings, and always compares bus values thereof and this method is often used. "IEEE MICRO December 1984" journal, "Fault Tolerance Achieved in VLSI" (Non-Patent Document 1) describes a method in which a master CPU and a checker CPU execute the same processing at the same time, and results are compared with each other by a comparison circuit.

A method capable of causing two CPUs to carry out switching therebetween and execute parallel operations and dual (redundant) comparing operations is proposed in the collection of papers "International Conference on Dependable Systems and Networks 2006", pages 45 to 54, paper "A Reconfigurable Generic Dual-Core Architecture" (Non-Patent Document 2). When the CPU fetches a special instruction called "mode switching instruction", the CPU stops operating and becomes a standby state for mode switching. When the two CPUs fetch the mode switching command instruction and become the standby state for mode switching, the CPUs start operating in a new mode. Performance is improved in a performance mode (parallel operation); and, in a safety mode (master/checker operation), a failure of the CPU can be detected by comparing outputs of the CPUs by a comparator, and safety is thus improved.

SUMMARY OF THE INVENTION

In above-described Non-Patent Document 1, the two CPUs are always in master/checker operations and exhibit high safety, but performances of the two CPUs correspond to that of one CPU.

In above-described Non-Patent Document 2, the switching between the parallel operation and the master/checker operation is carried out depending on the degree of the safety required for processing; therefore, performance can be improved while ensuring required safety. However, since the two CPUs use the instruction called mode switching instruction to switch the modes, the CPU which has first fetched the mode switching instruction becomes the standby state until the other CPU fetches the mode switching instruction.

In the safety mode, the two CPUs fetch the mode switching instructions at the same time; however, in the performance mode, the CPUs fetch the instructions at mutually different timing. It is also conceivable to start mode switching by an interrupt. Generally, priority levels of interrupt processes can be set in a MCU; and, when an interrupt having the highest priority level among interrupt requests is selected and the interrupt exceeds an interrupt mask level of CPU, it is accepted by the CPU.

In the performance mode, the interrupt mask levels of the two CPUs are mutually different in some cases, and it is conceivable that an interrupt request for carrying out mode switching is accepted by one of the CPUs, but not accepted by the other CPU. In this situation, the CPU which has first accepted the interrupt executes the mode switching according to a mode switching instruction and becomes the standby state, and the CPU which has then accepted the interrupt becomes the standby state until a mode switching instruction is fetched; wherein, the operation is carried out by the single CPU, and the processing efficiency of the CPUs is lowered even though the mode is the performance mode.

A typical preferred aim of the present invention is to provide a computer system which shortens a standby time of CPUs upon switching from a performance mode to a safety mode and improves CPU processing efficiency of the performance mode.

The above and other preferred aims and novel characteristics of the present invention will be apparent from the description of the present specification and the accompanying drawings.

The typical ones of the inventions disclosed in the present application will be briefly described as follows.

A brief summary of a typical invention is a computer system including: at least two CPUs; and a programmable interrupt controller for interrupting the CPU, in which the interrupt controller includes an interrupt CPU setting register capable of setting one or a plurality of CPUs to be interrupted for each interrupt factor, and, if the plurality of CPUs to be interrupted are set, the interrupt controller can take two accepting methods of: accepting an interrupt in an order from the CPU which becomes capable of accepting the interrupt; and accepting interrupts at one time after all of the CPUs to be interrupted become acceptable. By virtue of this, when carrying out the same interrupt processes by at least two CPUs, the interrupts are accepted after all of the CPUs serving as the targets become capable of accepting the interrupts to detect failure by exchanging the results and collating them by software; therefore, a standby time of the CPU which has first become capable of accepting the interrupt can be shortened.

A brief summary of another typical invention is a computer system including: at least two CPUs; a programmable interrupt controller for interrupting the CPU; and a comparator for mutually comparing outputs of the CPUs, the computer system being capable of switching between a performance mode of executing mutually different processes by the CPUs, respectively, to improve performance and a safety mode of executing mutually the same processes by the CPUs and collating results by the comparator to detect failure, the computer system being capable of setting one or a plurality of CPUs to be interrupted for each interrupt factor; and an interrupt mode setting register capable of setting a mode to be executed per the interrupt factor, the mode being the performance mode or the safety mode. By virtue of this, for example, in a situation in which the mode of the selected interrupt factor is the safety mode when the mode that is currently being executed is the performance mode, an interrupt request thereof is prevented from being output to the CPU, the processings of the CPUs are stopped after all of the CPUs to be interrupted become acceptable, the operation mode is switched from the performance mode to the safety mode, and the interrupt requests can be output to the CPUs; therefore, the standby time of the CPUs can be shortened upon switching from the performance mode to the safety mode.

The effects obtained by typical aspects of the present invention will be briefly described below.

As an effect obtained by the typical inventions, when carrying out the same interrupt processes by the at least two CPUs, interrupts are accepted after all of the CPUs serving as targets have become acceptable; therefore, a standby time of the CPU which first accepted the interrupt can be shortened.

As another effect obtained by the typical inventions, upon switching from the performance mode to the safety mode, the standby time of the CPU can be shortened.

BRIEF DESCRIPTIONS OF THE DRAWINGS

FIG. 2 is a diagram illustrating examples of interrupt priority level setting registers according to the first embodiment;

FIG. 3 is a diagram illustrating examples of interrupt CPU setting registers according to the first embodiment;

FIG. 4 is a diagram illustrating an example of an interrupt mode setting register in the first embodiment;

FIG. 6 is a diagram illustrating details of an example of the operation of integration control of the interrupt controller of FIG. 5 according to the first embodiment;

FIG. 11 is a diagram illustrating details of an example of an operation of integration control of the interrupt controller of FIG. 10 according to the second embodiment;

FIG. 13 is a diagram illustrating an example of a status register (interrupt relation) of the CPU in the second embodiment;

FIG. 14 is a diagram illustrating an example of a description about how to accept interrupt in an operation manual appended to the MCU according to the first embodiment;

FIG. 15 is a diagram illustrating an example of a description about how to accept interrupt in an operation manual appended to the MCU according to the first embodiment;

FIG. 16 is a diagram illustrating an example of a description about how to accept interrupt in an operation manual appended to the MCU according to the first embodiment;

FIG. 17 is a diagram illustrating an example of a description about how to accept interrupt in an operation manual appended to the MCU according to the first embodiment;

FIG. 18 is a diagram illustrating an example of a description about how to accept interrupt in an operation manual appended to the MCU according to the first embodiment;

FIG. 19 is a diagram illustrating an example of a description about how to accept interrupt in an operation manual appended to the MCU according to the first embodiment;

FIG. 20 is a diagram illustrating an example of a description about how to accept interrupt in an operation manual appended to the MCU according to the second embodiment;

FIG. 21 is a diagram illustrating an example of a description about how to accept interrupt in an operation manual appended to the MCU according to the second embodiment;

FIG. 22 is a diagram illustrating an example of a description about how to accept interrupt in an operation manual appended to the MCU according to the second embodiment;

FIG. 23 is a diagram illustrating an example of a description about how to accept interrupt in an operation manual appended to the MCU according to the second embodiment;

FIG. 24 is a diagram illustrating an example of a description about how to accept interrupt in an operation manual appended to the MCU according to the second embodiment;

FIG. 25 is a diagram illustrating an example of a description about how to accept interrupt in an operation manual appended to the MCU according to the second embodiment;

FIG. 26 is a diagram illustrating an example of a description about how to accept interrupt in an operation manual appended to the MCU according to the second embodiment;

FIG. 27 is a diagram illustrating an example of a description about how to accept interrupt in an operation manual appended to the MCU according to the second embodiment.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
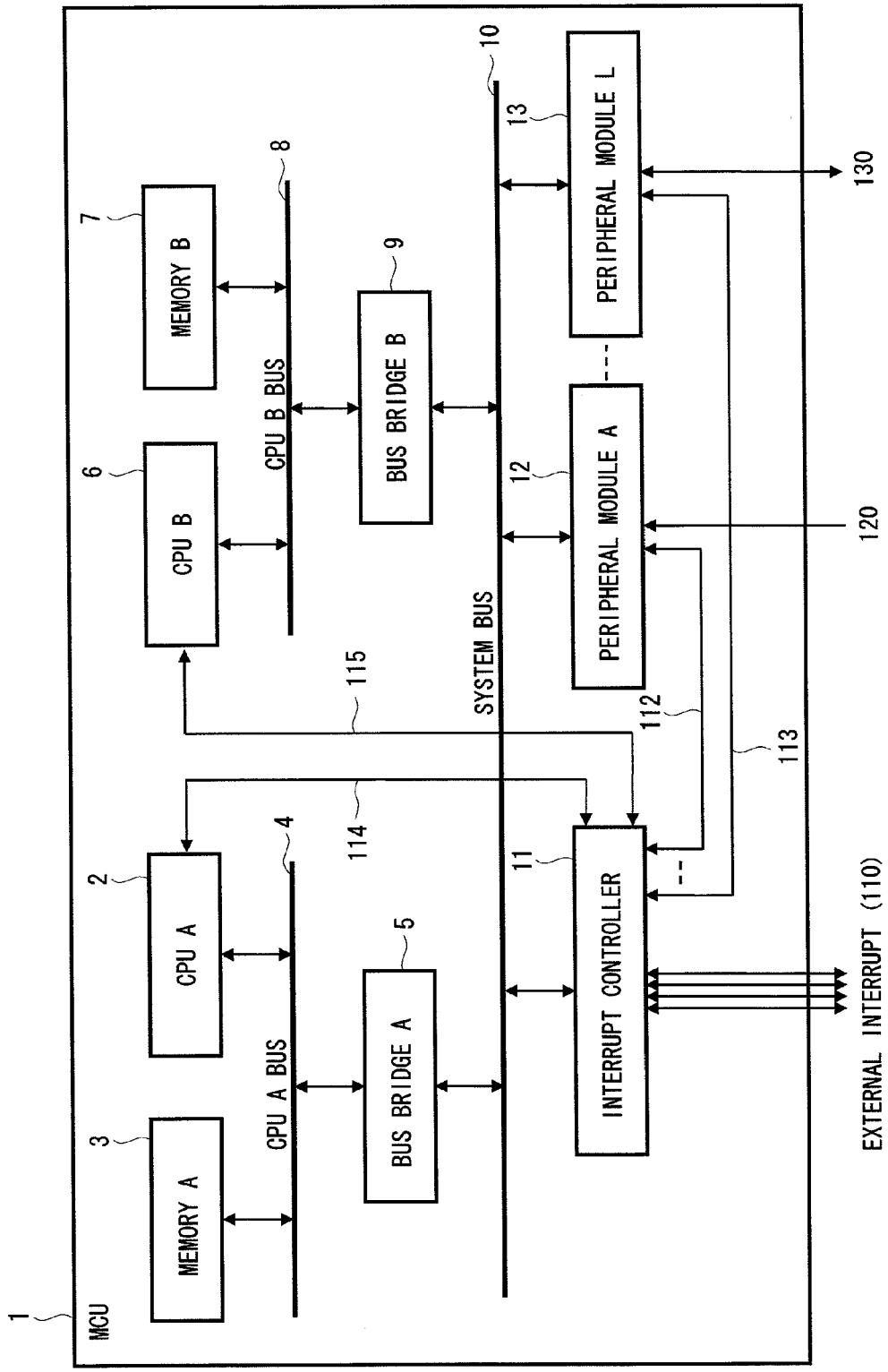
FIG. 1 is a diagram illustrating an example of a dual-core MCU having two CPUs according to a first embodiment in which a computer system of the present invention is used.

FIG. 1 is a diagram illustrating an example of a dual-core MCU having two CPUs which is a first embodiment using a computer system of the present invention. A microcomputer (MCU) 1 of the present embodiment includes: a CPU A 2 and a CPU B 6, a memory A 3 and a memory B 7, a CPU A bus 4 and a CPU B bus 8, a bus bridge A 5 and a bus bridge B 9, a system bus 10, an interrupt controller 11, a peripheral module A 12 to a peripheral module L 13, etc.

The CPU A 2 is a processor which executes instructions and carries out processes such as calculation and data transfer. The memory A 3 stores the instructions executed by the CPU A 2 and the data processed by the CPU A 2. The CPU A bus 4 is a bus by which the CPU A 2 accesses modules such as the memory A 3. The bus bridge A 5 is a controller connecting and controlling the CPU A bus 4 and the system bus 10 when the CPU A 2 accesses a module connected outside of the system bus 10.

The CPU B 6 is a processor which executes instructions and carries out processes such as calculations and data transfer. The memory B 7 stores the instructions executed by the CPU B 6 and the data processed by the CPU B 6. The CPU B bus 8 is a bus by which the CPU B 6 accesses modules such as the memory B 7. The bus bridge B 9 is a controller connecting and controlling the CPU B bus 8 and the system bus 10 when the CPU B 6 accesses a module connected outside of the system bus 10.

The interrupt controller 11 is a module which selects a request having a highest priority level, which is set in advance, and interrupts the CPUs when there are interrupt requests from an external interrupt 110 and the peripheral modules A 12 to L 13.

The interrupt controller 11 and an interface 112 of the peripheral module A 12 contain an interrupt request signal from the peripheral module A 12 and a response signal indicating that an interrupt from the interrupt controller 11 has been accepted.

The interrupt controller 11 and an interface 113 of the peripheral module L 13 contain an interrupt request signal from the peripheral module L 13 and a response signal indicating that an interrupt from the interrupt controller 11 has been accepted.

The interrupt controller 11 and an interface 114 of the CPU A 2 contain an interrupt request signal from the interrupt controller 11 and an interrupt mask signal from the CPU A 2. The interrupt controller 11 outputs an interrupt request when the priority level of a selected interrupt factor is higher than that of the interrupt mask signal from the CPU A 2.

The interrupt controller 11 and an interface 115 of the CPU B 6 contain an interrupt request signal from the interrupt controller 11 and an interrupt mask signal from the CPU B 6. The interrupt controller 11 outputs an interrupt request when a priority level of a selected interrupt factor is higher than that of the interrupt mask signal from the CPU B 6.

The peripheral module A 12 is, for example, an A/D converter which converts an analog input 120 to a digital signal.

The peripheral module L 13 is, for example, a module which carries out communication processes via a communication interface 130.

FIG. 2 is a diagram illustrating an example of interrupt priority level setting registers which set the priority levels of interrupt factors. The interrupt priority level setting registers are built in, for example, the interrupt controller 11. Herein, an example in which there are four external interrupt factors and twelve peripheral module interrupt factors is illustrated. Interrupt priority level setting registers IPR0, IPR1, IPR2, and IPR3 are 16-bit registers in each of which the priority levels of four interrupt factors are set by 4 bits. In IPR0, an external interrupt 0 (E0) is set at bits 15 to 12, an external interrupt 1 (E1) is set at bits 11 to 8, an external interrupt 2 (E2) is set at bits 7 to 4, and an external interrupt 3 (E3) is set at bits 3 to 0. The set values can be in 16 ways from B0000 (B represents a binary number) to B1111, wherein the higher the numerical value, the higher the priority level. IPR1, IPR2, and IPR3 set the priority levels of peripheral module interrupts A (PA) to L (PL).

FIG. 3 is a diagram illustrating examples of interrupt CPU setting registers which set a CPU to be interrupted per interrupt factor. The interrupt CPU setting registers are built in, for example, the interrupt controller 11. The registers include an interrupt CPU setting register 0 (ICP0) which sets the interrupt with respect to the CPU A 2 and an interrupt CPU setting register 1 (ICP1) which sets the interrupt with respect to the CPU B 6. An interrupt factor is associated with each of the bits of the registers. For example, a bit 15 carries out the setting of the external interrupt 0. If 0 is set, interrupt is not carried out even when there is an interrupt request. If 1 is set, an interrupt request is carried out. Four ways of interrupt methods that: interrupt is not to be carried out; the CPU A is to be interrupted; the CPU B is to be interrupted; and the CPU A and the CPU B are to be interrupted can be selected for each interrupt factor by the setting of ICP0 and ICP1.

FIG. 4 is a diagram illustrating an example of an interrupt mode setting register IMD, in which, with respect to the interrupt factors set to interrupt both the CPU A and the CPU B, an individual mode in which a request is individually output to the CPU which has become able to accept an interrupt request and a simultaneous mode in which requests are output simultaneously after both of the CPU A and the CPU B become acceptable are set. The interrupt mode setting register is built in, for example, the interrupt controller 11. The interrupt factors are associated with the bits of the register, respectively. For example, the setting of the peripheral module interrupt A (PA) is set at a bit 11. 0 represents an individual mode, and 1 represents a simultaneous mode.

Figure 5:
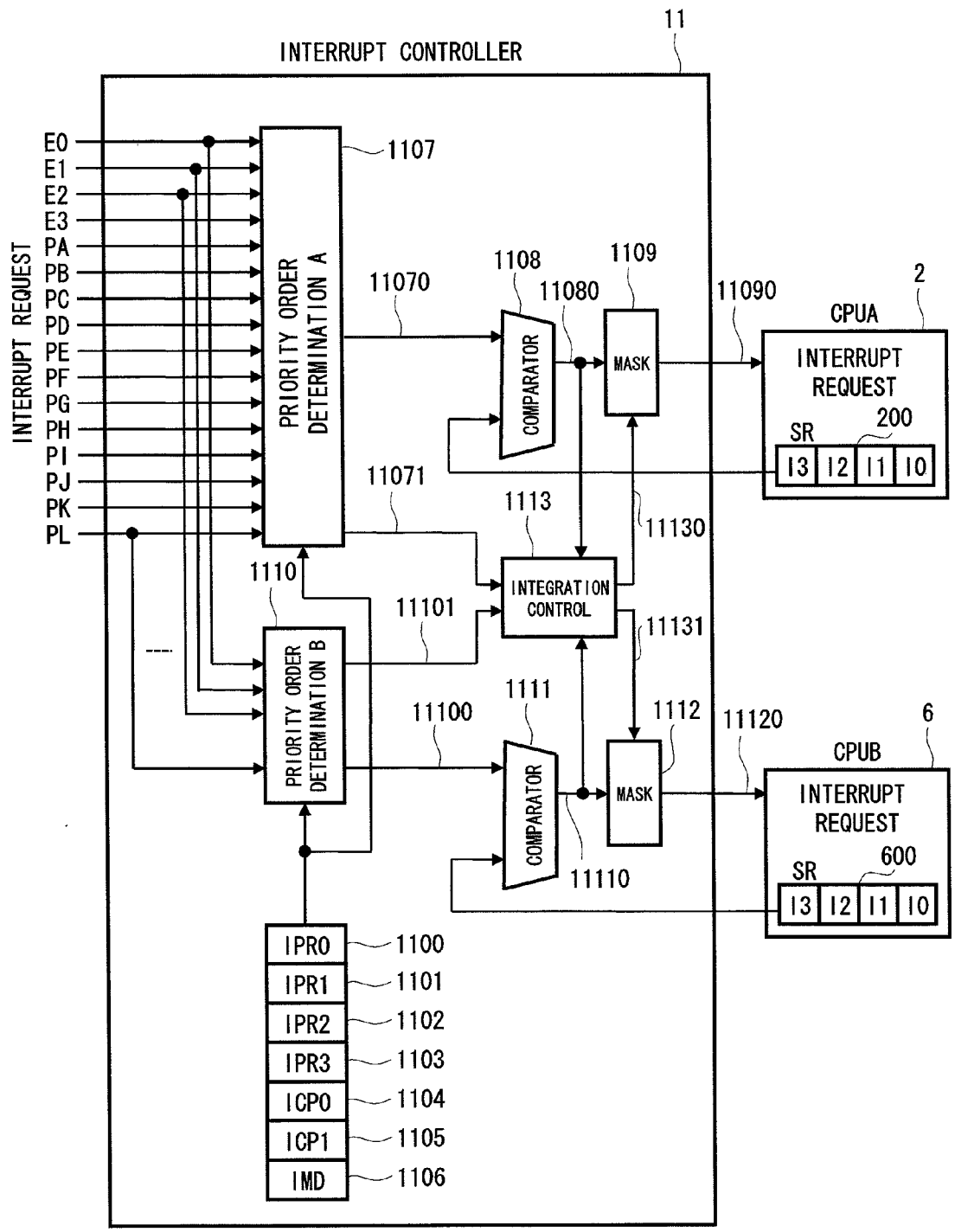
FIG. 5 is a diagram illustrating an example of an internal configuration of an interrupt controller and CPU A and CPU B of FIG. 1 according to the first embodiment.

FIG. 5 is a diagram illustrating an example of an internal configuration of the interrupt controller 11 and the connections with the CPU A 2 and the CPU B 6. The interrupt controller 11 includes: the registers such as IPR0 (1100) to IPR3 (1103), ICP0 (1104) and ICP1 (1105), and IMD (1106); and circuits such as priority order determination A 1107 and priority order determination B 1110, a comparator 1108 and a comparator 1111, a mask 1109 and a mask 1112, and integration control 1113.

IPR0 (1100), IPR1 (1101), IPR2 (1102), and IPR3 (1103) are the interrupt priority level setting registers. ICP0 (1104) and ICP1 (1105) are the interrupt CPU setting registers. IMD (1106) is the interrupt mode setting register.

In accordance with the setting of the registers 1100 to 1106, the priority order determination A 1107 selects a request having the highest priority level with respect to the CPU A 2 from among the interrupt requests E0 to PL and outputs a priority level 11070 thereof. Moreover, the mode (the individual mode or the simultaneous mode) and the interrupt number (for example, 15 for E0, 14 for E1, . . . , 0 for PL) of the selected request are output as an attribute signal 11071.

The comparator 1108 compares the interrupt priority level 11070 for the CPU A 2 with interrupt mask bits I3, I2, I1, and I0 (200) stored in a status register SR of the CPU A 2 and, if the interrupt priority level 11070 exceeds the interrupt mask level 200, causes a comparison result 11080 to be 1 (with request). If the interrupt priority level 11070 is equal to or smaller than the interrupt mask level 200, the comparison result 11080 is caused to be 0 (without request).

The mask 1109 disables the comparison result 11080 in accordance with a mask signal 11130 from the integration control 1113.

The priority order determination B 1110 selects a request having the highest priority level with respect to the CPU B 6 from among the interrupt requests E0 to PL in accordance with the setting of the registers 1100 to 1106 and outputs a priority level 11100 thereof. Moreover, a mode and an interrupt number of the selected request are output as an attribute signal 11101.

The comparator 1111 compares the interrupt priority level 11100 for the CPU B 6 with interrupt mask bits I3, I2, I1, and I0 (600) stored in a status register SR of the CPU B 6 and, if the interrupt priority level 11100 exceeds the interrupt mask level 600, causes a comparison result 11110 to be 1 (with request). If the interrupt priority level 11100 is equal to or smaller than the interrupt mask level 600, the comparison result 11110 is caused to be 0 (without request).

The mask 1112 disables the comparison result 11110 in accordance with a mask signal 11131 from the integration control 1113.

The integration control 1113 carries out integration control of the interrupt with respect to the CPU A 2 and the interrupt with respect to the CPU B 6. The interrupt attribute signals 11071 and 11101 and the comparison results 11080 and 11110 are input to the integration control, and the comparison result mask signals 11130 and 11131 are output therefrom. Only main points of the integration control 1113 will be described. Mask is not carried out if the interrupt with respect to the CPU A 2 and the interrupt with respect to the CPU B 6 are only in the individual mode. Mask is carried out if there is an interrupt request of the simultaneous mode.

FIG. 6 is a diagram illustrating details of an example of the operation of the integration control 1113. Ten cases are conceivable depending on the combinations of the comparator outputs, the modes of the requests, the interrupt numbers (match/non-match). "A" represents an interrupt to the CPU A 2, and "B" represents an interrupt to the CPU B 6.

Case 1 represents a situation in which the comparator outputs of A and B are both 0 (without request), where the mask signals become 0 (without mask) regardless of the modes of the requests and the interrupt numbers.

Case 2 represents a situation in which the comparator output A is 1 (with request) in the individual mode and B is 0, where the mask signals become 0.

Case 3 represents a situation in which the comparator output B is 1 in the individual mode and A is 0, where the mask signals become 0.

Case 4 represents a situation in which the comparator output A is 1 in the individual mode and B is 1 in the individual mode, where the mask signals become 0.

Case 5 represents a situation in which the comparator output A is 1 in the simultaneous mode and B is 0, where the mask signal A becomes 1. This means that the interrupt priority level exceeds the mask level of the CPU A 2, but not exceeding the mask level of the CPU B 6. The mask signal A is maintained at 1 to disable the request so that the interrupt request to the CPU A 2 is not output until the mask level of the CPU B 6 is lowered to enable accepting of the interrupt request.

Case 6 represents a situation in which the comparator output B is 1 in the simultaneous mode and A is 0, where the mask signal B becomes 1. This means that the interrupt priority level exceeds the mask level of the CPU B 6, but not exceeding the mask level of the CPU A 2. The mask signal B is maintained at 1 to disable the request so that the interrupt request to the CPU B 6 is not output until the mask level of the CPU A 2 is lowered to enable accepting of the interrupt request.

Case 7 represents a situation in which the comparator output A is 1 in the individual mode and the comparator output B is 1 in the simultaneous mode, where the mask signal B becomes 1. This means that the interrupt request of the individual mode having a higher priority level than that of the interrupt request of the simultaneous mode selected for the CPU B 6 is selected for the CPU A 2. The interrupt request to the CPU A 2 is output, and the interrupt request to the CPU B 6 is disabled.

Case 8 represents a situation in which the comparator output A is 1 in the simultaneous mode and the comparator output B is 1 in the individual mode, where the mask signal A becomes 1. This means that the interrupt request of the individual mode having a higher priority level than that of the interrupt request of the simultaneous mode selected for the CPU A 2 is selected for the CPU B 6. The interrupt request to the CPU B 6 is output, and the interrupt request to the CPU A 2 is disabled.

Case 9 represents a situation in which comparator outputs A and B are both 1 in the simultaneous mode and the interrupt numbers thereof are not matching each other, where the mask signals A and B become 1. This means that the interrupt factors of the simultaneous mode selected for the CPU A 2 and the CPU B 6 are mutually different. However, this situation cannot happen since the setting of the priority level is not independently carried out for each of the CPUs.

Case 10 represents a situation in which the comparator outputs A and B are both 1 in the simultaneous mode and the interrupt numbers thereof match each other, where the mask signals A and B become 0. The interrupts of the simultaneous mode are output simultaneously to the CPU A 2 and the CPU B 6 under this condition.

Figure 7:
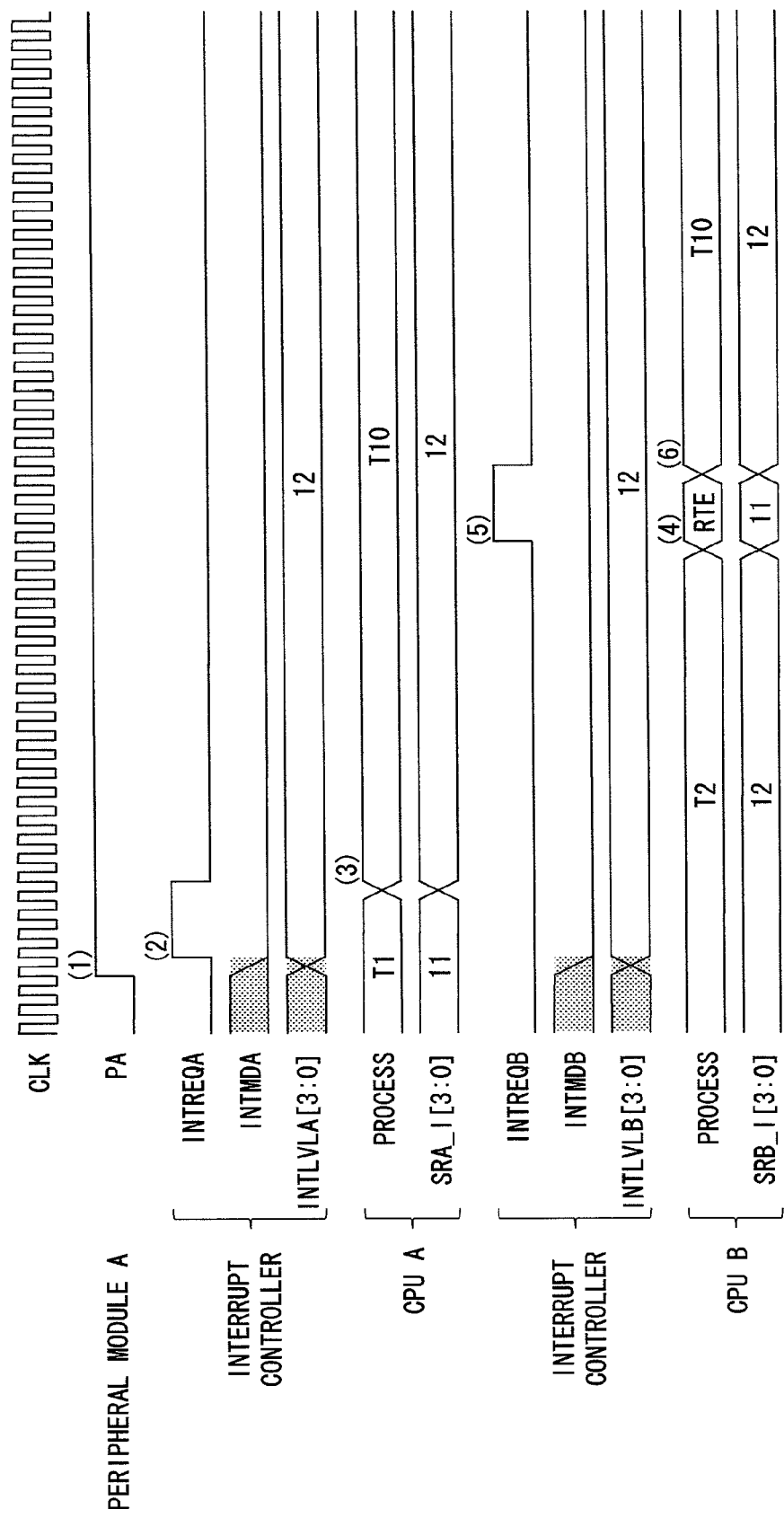
FIG. 7 is a timing chart illustrating an example of an individual mode interrupt according to the first embodiment.

FIG. 7 is a timing chart illustrating an example of an individual mode interrupt. CLK means a clock for operating functional modules of a MCU including the CPUs.

(1) An interrupt request PA from the peripheral module A 12 comes in. PA is to individually interrupt both the CPU A 2 and the CPU B 6.

(2) An interrupt mode INTMDA with respect to the CPU A 2 is 0 (individual), and an interrupt level INTLVLA [3:0] is 12 which is higher than 11 of an interrupt mask level SRA_I [3:0] of the CPU A 2; therefore, the interrupt controller 11 causes an interrupt request INTREQA with respect to the CPU A2 to be 1 (with request).

(3) The CPU A 2 accepts the interrupt during execution of a task T1 and branches the same to an interrupt processing routine T10 of PA. Moreover, the value 12 of the interrupt level INTLVLA [3:0] is copied to the mask bits of the status register, and SRA_I [3:0] is updated to 12. The values of INTLVLA [3:0] and SRA_I [3:0] have become the same; therefore, the interrupt controller 11 changes INTREQA from 1 to 0 to withdraw the interrupt request.

(4) The CPU B 6 has been executing a task T2 (interrupt processing routine); however, since the process is finished, a return from exception instruction RTE is executed. A value which has been saved in a stack is returned to the status register, thereby returning the interrupt mask level SRB_I [3:0] to 11.

(5) The interrupt mode INTMDB with respect to the CPU B 6 is 0 (individual), and the interrupt level INTLVLB [3:0] is 12 which is higher than 11 of the interrupt mask level SRB_I [3:0] of the CPU B 6; therefore, the interrupt controller 11 causes the interrupt request INTREQB with respect to the CPU B 6 to be 1 (with request).

(6) The CPU B 6 accepts the interrupt and branches the same to an interrupt processing routine T10 of PA. The value 12 of the interrupt level INTLVLB [3:0] is copied to mask bits of the status register, and SRB_I [3:0] is updated to 12. The values of INTLVLB [3:0] and SRB_I [3:0] have become the same; therefore, the interrupt controller 11 changes INTREQB from 1 to 0 to withdraw the interrupt request.

In this manner, the interrupts of the individual mode are accepted at the timing at which the CPU A 2 and the CPU B 6 become acceptable, respectively.

Figure 8:
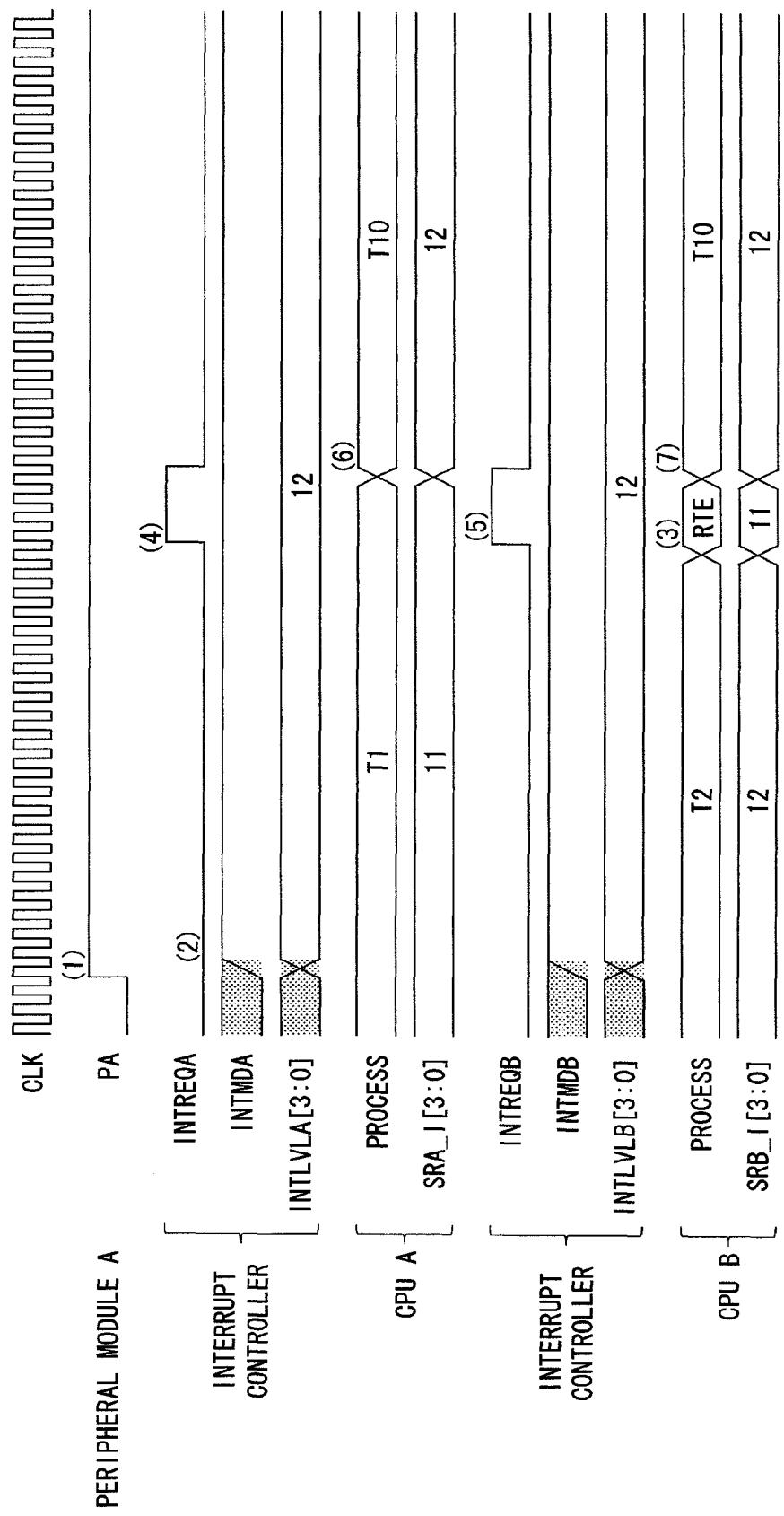
FIG. 8 is a timing chart illustrating an example of an interrupt of a simultaneous mode according to the first embodiment.

FIG. 8 is a timing chart illustrating an example of an interrupt of the simultaneous mode.

(1) An interrupt request PA from the peripheral module A 12 comes in. PA is to simultaneously interrupt both the CPU A 2 and the CPU B 6.

(2) The interrupt mode INTMDA with respect to the CPU A 2 is 1 (simultaneous), and the interrupt level INTLVLA [3:0] is 12 which is higher than 11 of the interrupt mask level SRA_I [3:0] of the CPU A 2; however, the interrupt level INTLVLB [3:0] with respect to the CPU B 6 is 12 which is the same as 12 of the interrupt mask level SRB_I [3:0] of the CPU B 6; therefore, the interrupt controller 11 causes the interrupt request INTREQA with respect to the CPU A 2 to be 0 (without request).

(3) The CPU B 6 has been executing a task T2 (interrupt processing routine); however, since the process is finished, the CPU B 6 executes a return from exception instruction RTE. The value which has been saved in a stack is returned to the status register, thereby returning the interrupt mask level SRB_I [3:0] to 11.

(4) The interrupt level INTLVLA [3:0] is 12 which is higher than 11 of the interrupt mask level SRA_I [3:0] of the CPU A 2, and the interrupt level INTLVLB [3:0] with respect to the CPU B 6 is 12 which is higher than 11 of the interrupt mask level SRB_I [3:0] of the CPU B 6; therefore, the interrupt controller 11 causes the interrupt request INTREQA with respect to the CPU A 2 to be 1 (with request).

(5) In the same manner as (4), the interrupt controller 11 causes the interrupt request INTREQB with respect to the CPU B 6 to be 1.

(6) The CPU A 2 accepts the interrupt during execution of a task T1 and branches the same to an interrupt processing routine T10 of PA. Moreover, the value 12 of the interrupt level INTLVLA [3:0] is copied to the mask bits of the status register, and SRA_I [3:0] is updated to 12. The values of INTLVLA [3:0] and SRA_I [3:0] have become the same; therefore, the interrupt controller 11 changes INTREQA from 1 to 0 and withdraws the interrupt request.

(7) The CPU B 6 accepts the interrupt and branches the same to an interrupt processing routine T10 of PA. Moreover, the value 12 of the interrupt level INTLVLB [3:0] is copied to the mask bits of the status register, and SRB_I [3:0] is updated to 12. The values of INTLVLB [3:0] and SRB_I [3:0] have become the same; therefore, the interrupt controller 11 changes INTREQB from 1 to 0 and withdraws the interrupt request.

In this manner, the interrupts of the simultaneous mode are accepted at the timing when both of the CPU A 2 and the CPU B 6 become capable of accepting the requests.

FIGS. 14 to 19 are drawings illustrating examples of descriptions about how to accept interrupts of an operation manual appended to the MCU 1 of the present embodiment. In the operation manual, how to accept interrupts as illustrated in FIGS. 14 to 19 are described.

For example, the operation manual illustrated in FIG. 14 describes that, about the interrupt CPU setting registers of the interrupt controller 11, etc., one or a plurality of CPUs to be interrupted can be set for each interrupt factor; and, if the plurality of CPUs to be interrupted are set, employable methods include two methods: a method of accepting the interrupt in the order from the CPU having become capable of accepting the interrupt and a method of accepting the interrupts at one time after all of the CPUs to be interrupted become acceptable.

Also, the operation manuals illustrated in FIGS. 15 and 16 describe about the interrupt CPU setting registers and the interrupt mode setting register of the interrupt controller 11, etc., and the contents thereof are as illustrated in FIGS. 15 and 16.

Furthermore, the operation manuals illustrated in FIGS. 17 to 19 describe about the interrupt CPU setting registers, the interrupt mode setting register, and the interrupt priority level setting registers of the interrupt controller 11; status registers of the CPU A 2 and the CPU B 6; etc., and the contents thereof are as illustrated in FIGS. 17 to 19.

According to the present embodiment described in the foregoing, interrupts of the individual mode are accepted at the timing at which each of the CPU A 2 and the CPU B 6 becomes capable of accepting requests, and interrupts of the simultaneous mode are accepted at the timing at which the CPU A 2 and the CPU B 6 both become capable of accepting the requests, respectively; therefore, when the same interrupt processes are to be carried out by the two CPUs A 2 and B 6, the standby time of the CPU which first accepts the request can be shortened because the request is accepted after all of the CPUs serving as targets become capable of accepting the interrupts. As a result, the standby time of the CPU can be shortened, and the CPU processing efficiency can be improved.

Second Embodiment

Figure 9:
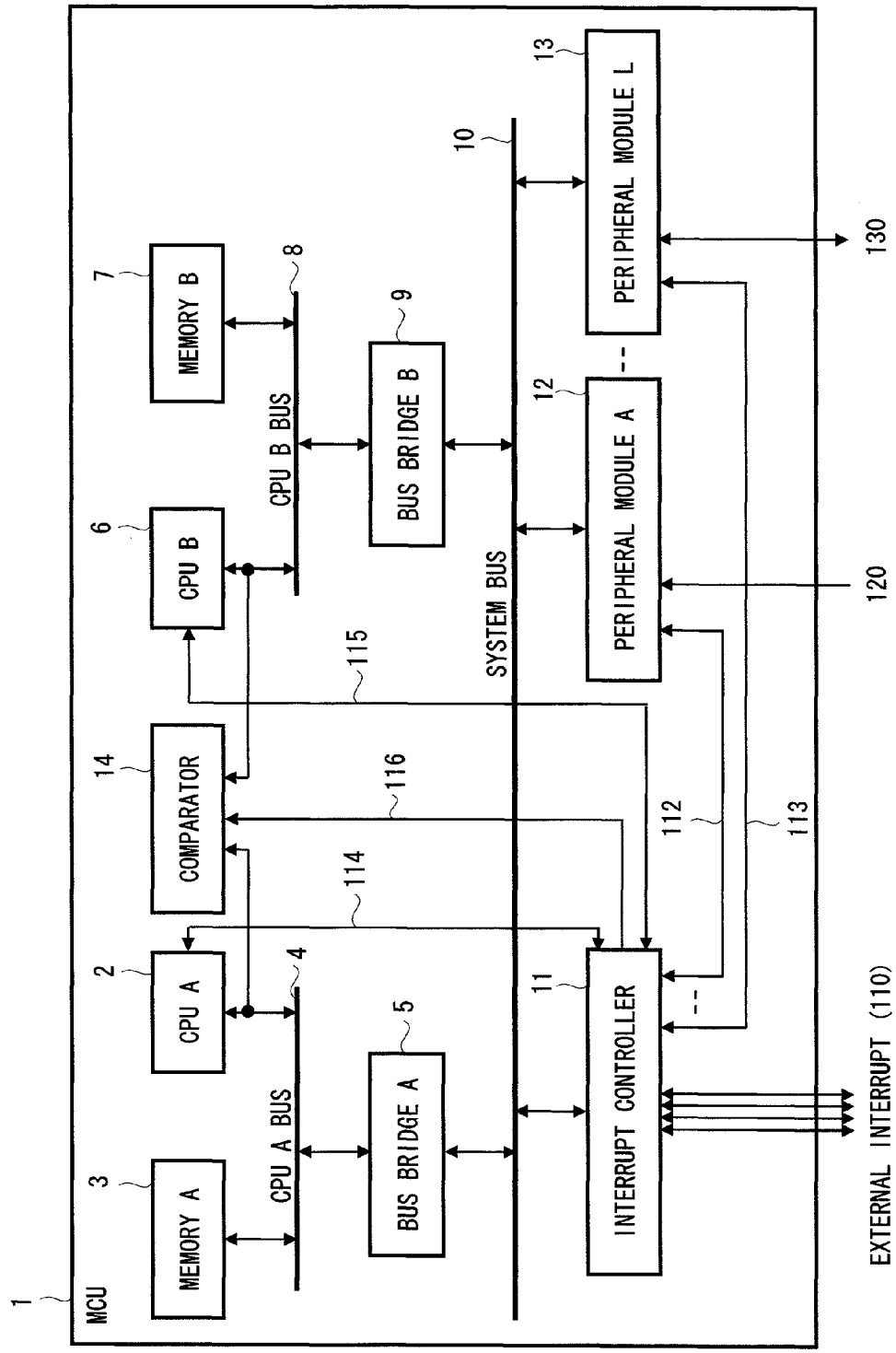
FIG. 9 is a diagram illustrating an example of a dual-core microcomputer having two CPUs and capable of dynamically carrying out switching between a performance mode of carrying out parallel processings and a safety mode of carrying out master/checker operations according to a second embodiment using a computer system of the present invention.

FIG. 9 is a diagram illustrating an example of a dual-core MCU having two CPUs and capable of dynamically carrying out switching between a performance mode of carrying out parallel processes and a safety mode of carrying out master/checker operations in a second embodiment using a computer system of the present invention. As compared with FIG. 1, a comparator 14 which compares outputs of the CPU A 2 and the CPU B 6 and an interface 116 between the interrupt controller 11 and the comparator 14 are added to the MCU 1 of the present embodiment.

In the performance mode, the CPU A 2 and the CPU B 6 independently process mutually different programs. In the performance mode, the comparator 14 is not operated. In the safety mode, the CPU A 2 and the CPU B 6 synchronously process the same program. In the safety mode, when the comparator 14 is operated and the outputs of the CPU A 2 and the CPU B 6 are mutually different, an error is output. The interface 116 from the interrupt controller 11 contains a mode signal indicating whether it is in the performance mode (value is 0) or the safety mode (value is 1).

Figure 10:
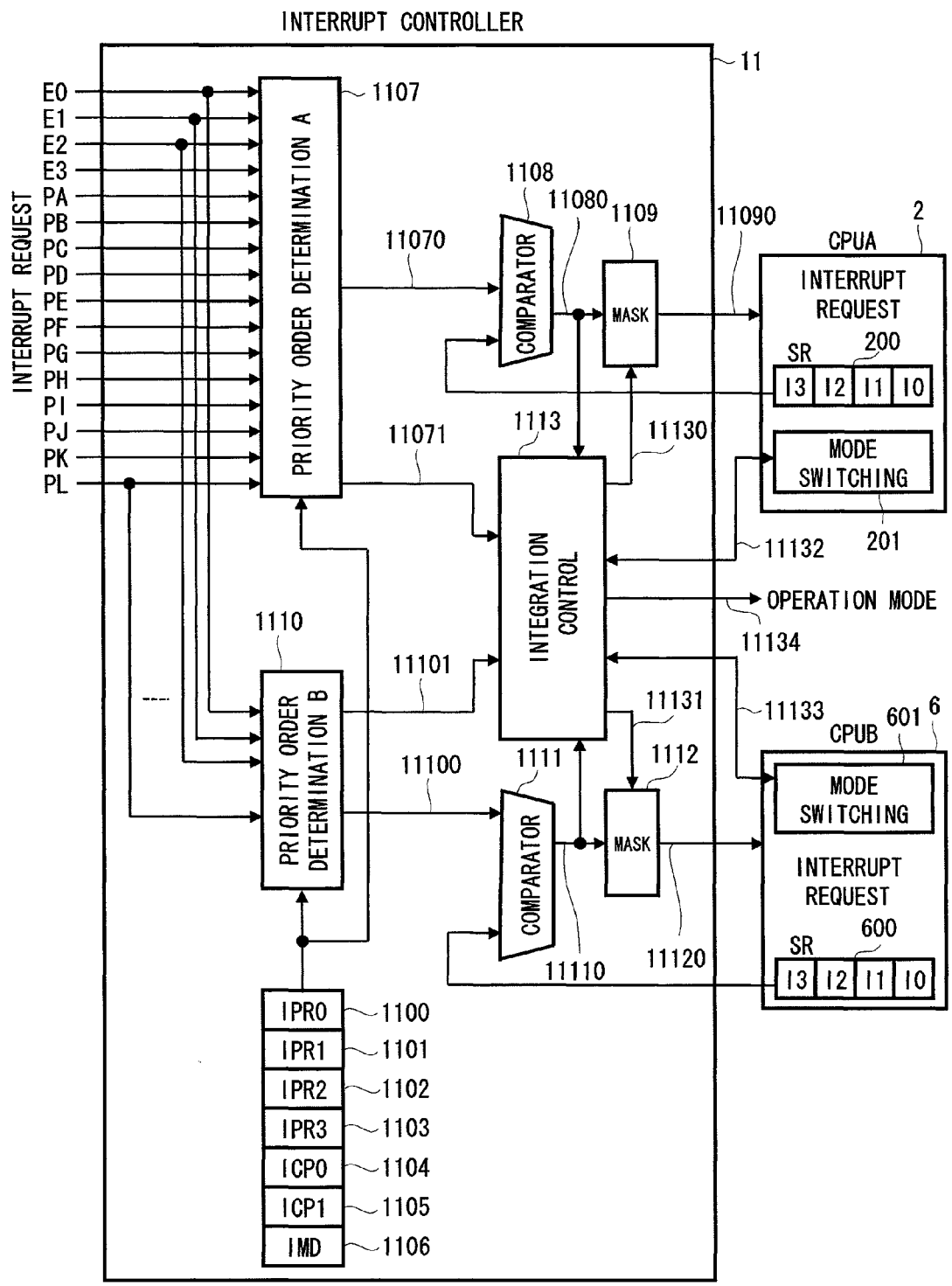
FIG. 10 is a diagram illustrating an example of an internal configuration of an interrupt controller and a connection of a CPU A and a CPU B of FIG. 9 according to the second embodiment.

FIG. 10 is a diagram illustrating an example of an internal configuration of the interrupt controller 11 and the connections of the CPU A 2 and the CPU B 6.

IPR0 (1100), IPR1 (1101), IPR2 (1102), and IPR3 (1103) are interrupt priority level setting registers. CP0 (1104) and ICP1 (1105) are interrupt CPU setting registers. IMD (1106) is an interrupt mode setting register.

In accordance with the setting of the registers 1100 to 1106, the priority order determination A 1107 selects a request having the highest priority level with respect to the CPU A 2 from among the interrupt requests E0 to PL and outputs the priority level 11070 thereof. Moreover, the mode (the performance mode or the safety mode) and the interrupt number (for example, 15 for E0, 14 for E1, ..., 0 for PL) of the selected request are output as an attribute signal 11071.

The comparator 1108 compares the interrupt priority level 11070 for the CPU A 2 with interrupt mask bits I3, I2, I1, and I0 (200) stored in the status register SR of the CPU A 2 and, if the interrupt priority level 11070 exceeds the interrupt mask level 200, causes the comparison result 11080 to be 1 (with request). If the interrupt priority level 11070 is smaller than or equal to the interrupt mask level 200, the comparison result 11080 is caused to be 0 (without request).

The mask 1109 disables the comparison result 11080 in accordance with the mask signal 11130 from the integration control 1113.

The priority order determination B 1110 selects a request having the highest priority level with respect to the CPU B 6 from among the interrupt requests E0 to PL in accordance with the setting of the registers 1100 to 1106 and outputs the priority level 11100 thereof. Moreover, the mode and the interrupt number of the selected request are output as the attribute signal 11101.

The comparator 1111 compares the interrupt priority level 11100 for the CPU B 6 with interrupt mask bits I3, I2, I1, and I0 (600) stored in the status register SR of the CPU B 6 and, if the interrupt priority level 11100 exceeds the interrupt mask level 600, causes the comparison result 11110 to be 1 (with request). If the interrupt priority level 11100 is smaller than or equal to the interrupt mask level 600, the comparison result 11110 is caused to be 0 (without request).

The mask 1112 disables the comparison result 11110 in accordance with the mask signal 11131 from the integration control 1113.

The integration control 1113 carries out integration control of the interrupt with respect to the CPU A 2 and the interrupt with respect to the CPU B 6. The interrupt attribute signals 11071 and 11101 and the comparison results 11080 and 11110 are input to the integration control, and the comparison result mask signals 11130 and 11131 are output. Moreover, mode switching functions 201 and 601 are added to the CPU A 2 and the CPU B 6. Also, two sets of registers are provided for the performance mode and the safety mode and configured so as to be switched depending on the modes. When the CPU becomes capable of accepting the interrupt request of the mode that is different from the mode which is currently being executed, the integration control 1113 of the interrupt controller 11 outputs a mode switching request (part of 11132, part of 11133). The CPU cancels the instruction which is being executed, retains a next instruction address of the lastly-executed instruction in a program counter, and stops operation. Next, the registers are switched to a mode which is different from the current mode, and a mode switching response signal (part of 11132, part of 11133) is output to the interrupt controller 11. When the mode switching response signals are returned from both of the CPU A 2 and the CPU B 6, the integration control 1113 switches an operation mode 11134 and outputs mode switching complete signals (part of 11132, part of 11133). The operation mode has become the same as the mode of the interrupt request; therefore, the comparison result mask signals 11130 and 11131 are changed from 1 (with mask) to 0 (without mask), and interrupt request signals 11090 and 11120 can be output.

FIG. 11 is a diagram illustrating details of an example of the operation of the integration control 1113. Twenty cases are conceivable depending on the combinations of the operating mode, the comparator outputs, the modes of the requests, the interrupt numbers (match/non-match). "A" represents an interrupt to the CPU A 2, and "B" represents an interrupt to the CPU B 6.

In Cases 1 to 10, the current mode is the performance mode.

Case 1 represents a situation in which the comparator outputs of A and B are both 0 (without request), where the mask signals become 0 (without mask) regardless of the modes of the requests and the interrupt numbers.

Case 2 represents a situation in which the comparator output A is 1 (with request) in the performance mode and B is 0, where the mask signals become 0. More specifically, an interrupt request to the CPU A 2 is output.

Case 3 represents a situation in which the comparator output B is 1 in the performance mode and A is 0, where the mask signals become 0. More specifically, an interrupt request to the CPU B 6 is output.

Case 4 represents a situation in which the comparator output A is 1 in the performance mode and B is 1 in the performance mode, where the mask signals become 0. More specifically, interrupt requests are output to the CPU A 2 and the CPU B 6.

Case 5 represents a situation in which the comparator output A is 1 in the safety mode and B is 0, where the mask signal A becomes 1. This means that the interrupt priority level exceeds the mask level of the CPU A 2, but not exceeding the mask level of the CPU B 6. The mask signal A is set at 1 to disable the request so that the interrupt request to the CPU A 2 is not output until the mask level of the CPU B 6 is lowered to enable accepting of the interrupt request.

Case 6 represents a situation in which the comparator output B is 1 in the safety mode and A is 0, where the mask signal B becomes 1. This means that the interrupt priority level exceeds the mask level of the CPU B 6, but not exceeding the mask level of the CPU A 2. The mask signal B is set at 1 to disable the request so that the interrupt request to the CPU B 6 is not output until the mask level of the CPU A 2 is lowered to enable reception of the interrupt request.

Case 7 represents a situation in which the comparator output A is 1 in the performance mode and the comparator output B is 1 in the safety mode, where the mask signal B becomes 1. This means that the interrupt request of the performance mode having a higher priority level than that of the interrupt request of the safety mode selected for the CPU B 6 is selected for the CPU A 2. The interrupt request to the CPU A 2 is output, and the interrupt request to the CPU B 6 is disabled.

Case 8 represents a situation in which the comparator output A is 1 in the safety mode and the comparator output B is 1 in the performance mode, where the mask signal A becomes 1. This means that the interrupt request of the performance mode having a higher priority level than that of the interrupt request of the safety mode selected for the CPU A 2 is selected for the CPU B 6. The interrupt request to the CPU B 6 is output, and the interrupt request to the CPU A 2 is disabled.

Case 9 represents a situation in which comparator outputs A and B are both 1 in the safety mode and the interrupt numbers thereof are not matching each other, where the mask signals A and B become 1. This means that the interrupt factors of the safety mode selected for the CPU A 2 and the CPU B 6 are mutually different. However, this situation cannot happen since the setting of the priority level is not independently carried out for each of the CPUs.

Case 10 represents a situation in which the comparator outputs A and B are both 1 in the safety mode and the interrupt numbers thereof match each other, where the mask signals A and B become 1. The mode switching is caused to be 1 (mode switching is carried out) as both of the CPU A2 and the CPU B 6 have become capable of accepting the requests of the safety mode.

In Cases 11 to 20, the current mode is the safety mode.

Case 11 represents a situation in which the comparator outputs of A and B are both 0 (without request), where the mask signals become 0 (no mask) regardless of the modes of the requests and the interrupt numbers.

Case 12 represents a situation in which the comparator output A is 1 (with request) in the performance mode and B is 0, where the mask signal A becomes 1. The mode switching becomes 1 as the CPU A 2 can accept an interrupt of the performance mode.

Case 13 represents a situation in which the comparator output B is 1 in the performance mode and A is 0, where the mask signals become 0. The mode switching becomes 1 since the CPU B 6 can accept an interrupt of the performance mode.

Case 14 represents a situation in which the comparator output A is 1 in the performance mode and B is 1 in the performance mode, where the mask signals A and B become 1. The mode switching becomes 1 as the CPU A 2 and the CPU B 6 can accept interrupts.

Case 15 represents a situation in which the comparator output A is 1 in the safety mode and B is 0, where the mask signal A becomes 1. This means that the interrupt priority level exceeds the mask level of the CPU A 2, but not exceeding the mask level of the CPU B 6. The mask signal A is set at 1 to disable the request so that the interrupt request to the CPU A 2 is not output until the mask level of the CPU B 6 is lowered to enable accepting of the interrupt request.

Case 16 represents a situation in which the comparator output B is 1 in the safety mode and A is 0, where the mask signal B becomes 1. This means that the interrupt priority level exceeds the mask level of the CPU B 6, but not exceeding the mask level of the CPU A 2. The mask signal B is maintained at 1 to disable the request so that the interrupt request to the CPU B 6 is not output until the mask level of the CPU A 2 is lowered to enable accepting of the interrupt request.

Case 17 represents a situation in which the comparator output A is 1 in the performance mode and the comparator output B is 1 in the safety mode, where the mask signals A and B become 1. This means that the interrupt request of the performance mode having a higher priority level than that of the interrupt request of the safety mode selected for the CPU B 6 is selected for the CPU A 2. The interrupt requests with respect to the CPU A 2 and the CPU B 6 are disabled. The mode switching becomes 1 as the CPU A 2 can accept an interrupt of the performance mode.

Case 18 represents a situation in which the comparator output A is 1 in the safety mode and the comparator output B is 1 in the performance mode, where the mask signals A and B become 1. This means that the interrupt request of the performance mode having a higher priority level than that of the interrupt request of the safety mode selected for the CPU A 2 is selected for the CPU B 6. The interrupt requests with respect to the CPU A 2 and the CPU B 6 are disabled. The mode switching becomes 1 as the CPU B 6 can accept an interrupt of the performance mode.

Case 19 represents a situation in which comparator outputs A and B are both 1 in the safety mode and the interrupt numbers thereof are not matching each other, where the mask signals A and B become 1. This means that the interrupt factors of the safety mode selected for the CPU A 2 and the CPU B 6 are mutually different. However, this case cannot happen as the setting of the priority level is not independently carried out for each of the CPUs.

Case 20 represents a situation in which the comparator outputs A and B are both 1 in the safety mode and the interrupt numbers thereof match each other, where the mask signals A and B become 0. The interrupts of the safety mode are output simultaneously to the CPU A 2 and the CPU B 6 under this condition.

Figure 12:
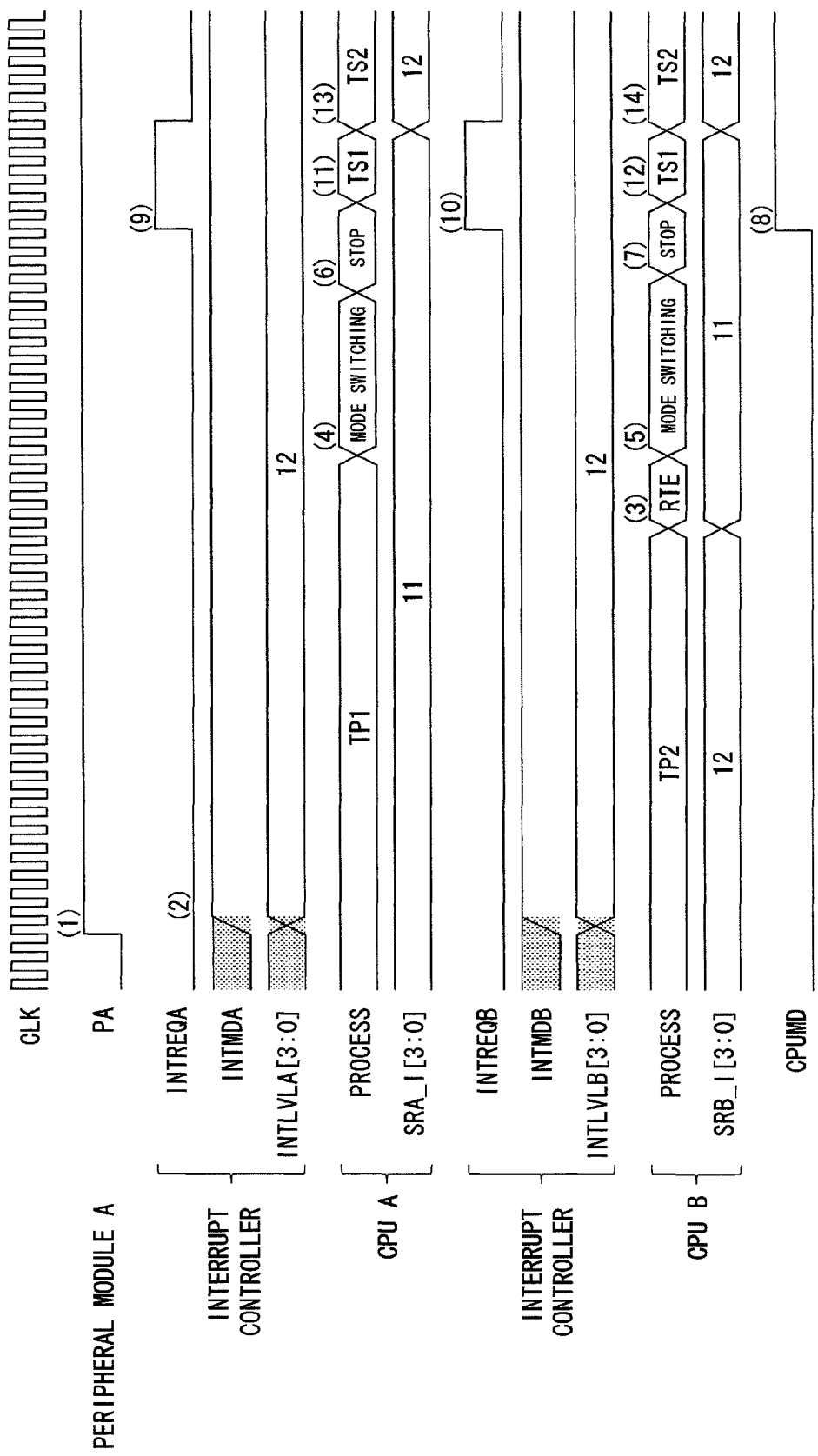
FIG. 12 is a timing chart illustrating an example of having interrupts of a safety mode occurring during operation by a performance mode according to the second embodiment.

FIG. 12 is a timing chart illustrating an example of the case in which interrupts of the safety mode occur during operation in the performance mode.

(1) An interrupt request PA from the peripheral module A 12 comes in.

(2) The interrupt mode INTMDA with respect to the CPU A 2 is 1 (safety), and the interrupt level INTLVLA [3:0] is 12 which is higher than 11 of the interrupt mask level SRA_I [3:0] of the CPU A 2; however, the interrupt level INTLVLB [3:0] with respect to the CPU B 6 is 12 which is the same as the interrupt mask level SRB_I [3:0] of the CPU B 6; therefore, the interrupt controller 11 causes the interrupt request INTREQA with respect to the CPU A 2 to be 0 (without request).

(3) The CPU B 6 has been executing a task TP2 (interrupt processing routine); however, since the process thereof is finished, the CPU B 6 executes a return from exception instruction RTE. The value which has been saved in the stack is returned to the status register, thereby returning the interrupt mask level SRB_I [3:0] to 11.

(4) The interrupt level INTLVLA [3:0] is 12 which is higher than 11 of the interrupt mask level SRA_I [3:0] of the CPU A 2, and the interrupt level INTLVLB [3:0] with respect to the CPU B 6 is 12 which is higher than 11 of the interrupt mask level SRB_I [3:0] of the CPU B 6; therefore, the interrupt controller 11 outputs mode switching requests to the CPU A 2 and the CPU B 6. In accordance with this, the CPU A 2 executes mode switching. The instruction being executed is cancelled, and the address of the next instruction of the lastly executed instruction is retained in the program counter.

(5) The CPU B 6 similarly executes mode switching.

(6) The CPU A 2 stops operating, switches the register to that of the safety mode, and outputs a mode switching response signal to the interrupt controller 11.

(7) The CPU B 6 also stops similarly, switches the register to that of the safety mode, and outputs a mode switching response signal to the interrupt controller 11.

(8) The mode signal CPUMD output from the interrupt controller 11 is changed from 0 (performance mode) to 1 (safety mode).

(9) The operation mode has become the safety mode; therefore, the interrupt controller 11 causes the interrupt request INTREQA with respect to the CPU A 2 to be 1 (with request).

(10) Similarly, the interrupt request INTREQB with respect to the CPU B 6 is caused to be 1.

(11) The CPU A 2 resumes operation and continuously executes a task TS1 which has been executed before switching to the performance mode.

(12) The CPU B 6 resumes operation and continuously executes a task TS1 which has been executed before switching to the performance mode.

(13) The CPU A 2 accepts INTREQA and branches the same to an interrupt processing routine TS2 of PA. Moreover, the value 12 of the interrupt level INTLVLA [3:0] is copied to the mask bits of the status register, and SRA_I [3:0] is updated to 12. The values of INTLVLA [3:0] and SRA_I [3:0] become the same; therefore, the interrupt controller 11 changes INTREQA from 1 to 0 to withdraw the interrupt request.

(14) The CPU B 6 accepts INTREQB and branches to an interrupt processing routine TS2 of PA. Moreover, the value 12 of the interrupt level INTLVLB [3:0] is copied to the mask bits of the status register, and SRB_I [3:0] is updated to 12. The values of INTLVLB [3:0] and SRB_I [3:0] have become the same; therefore, the interrupt controller 11 changes INTREQB from 1 to 0 to withdraw the interrupt request.

In this manner, the interrupts of the safety mode generated during the operation in the performance mode are accepted after the performance mode is switched to the safety mode at the timing at which both of the CPU A 2 and the CPU B 6 have become capable of accepting the requests.

FIG. 13 is a diagram illustrating an example of the status register (interrupt relation) of the CPU (CPU A 2, CPU B 6). Bits 7 to 4 are the interrupt mask bits I3, I2, I1, and I0. A bit 8 is a mode switching bit MC. At MC, 0 means no mode switching, and 1 means mode switching.

The two sets of status registers are provided respectively for the performance mode and the safety mode and configured to be switched depending on the mode. MC is initialized to 0 by reset. After mode switching, MC of the status register is caused to be 1. When an interrupt is accepted, the status register is saved in the stack. The interrupt level is written to the interrupt mask bits, and MC is caused to be 0. When the interrupt process is finished and the value of the status register is recovered from the stack, MC becomes 1. It can be understood that mode switching has been carried out before the interrupt is input; therefore, a mode switching process can be carried out to return to the original mode.

FIGS. 20 to 27 are diagrams illustrating examples of the description about how to accept interrupts of the operation manual appended to the MCU 1 of the present embodiment. The operation manuals describe how to accept interrupts as illustrated in FIGS. 20 to 27.

For example, the operation manual illustrated in FIG. 20 describes, regarding a configuration capable of carrying out switching between the performance mode of executing mutually different processes by the CPUs to improve performance and the safety mode of executing the same process by the CPUs and collating the results by the comparator to detect failure, in relation to the interrupt CPU setting registers and the interrupt mode setting registers of the interrupt controller 11, the integration control 1113, etc., that one or a plurality of CPUs to be interrupted can be set for each interrupt factor; and which mode to be executed in the performance mode or the safety mode can be set for each interrupt factor; and, in a situation in which the mode of a selected interrupt factor is the performance mode when the mode currently being executed is the performance mode, the interrupt request thereof is output to the CPU.

The operation manuals illustrated in FIGS. 21 to 23 describe about the interrupt CPU setting registers and the interrupt mode setting registers of the interrupt controller 11, the integration control 1113, etc.; and the contents thereof are as illustrated in FIGS. 21 to 23.

Furthermore, the operation manuals shown in FIG. 24 to FIG. 27 describe about the interrupt setting registers, the interrupt mode setting register, and the interrupt priority level setting registers of the interrupt controller 11; the status registers of the CPU A 2 and the CPU B 6; etc.; and the contents thereof are as illustrated in FIGS. 24 to 27.

According to the present embodiment described above, in the same manner as the first embodiment, when the same interrupt processes are to be carried out by the two CPUs A 2 and B 6, the interrupts are accepted after all the CPUs serving as the targets become capable of accepting the interrupts; therefore, the standby time of the CPU which first accepted the interrupt can be shortened. Particularly, in the present embodiment, the interrupt of the safety mode generated during operation in the performance mode is accepted after the performance mode is switched to the safety mode at the timing at which both of the CPU A 2 and the CPU B 6 become capable of accepting the requests. Therefore, upon switching from the performance mode to the safety mode, the standby time of the CPU can be shortened, and the CPU processing efficiency of the performance mode can be improved.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the above-described first and second embodiments, the dual-core MCU having the two CPUs has been described as an example. However, the number of the CPUs is not limited to two, and the present invention can be widely applied to a computer system having at least two or more CPUs such as three or more CPUs.

The computer system of the present invention relates to a computer system such as a micro controller having a plurality of CPUs and can be used in, for example, a control system of an automobile.

What is claimed is:

1. A computer system comprising:
at least two CPUs; and
an interrupt controller for interrupting the at least two CPUs,
wherein the interrupt controller is programmable and includes an interrupt CPU setting register configured to set one or a plurality of CPUs to be interrupted,
wherein, if the plurality of CPUs to be interrupted are set, the interrupt controller is configured to operate in accordance with at least two accepting modes comprising
accepting an interrupt from one of the at least two CPUs which becomes capable of accepting the interrupt, in accordance with a first state; and
accepting all interrupts at one time after all of the CPUs to be interrupted become capable of accepting the interrupt, in accordance with a second state.

2. The computer system according to claim 1,
wherein the interrupt controller further includes an interrupt mode setting register configured to set a mode of accepting an interrupt, and
wherein one of said first and second states is determined based on a value of the interrupt mode setting register.

3. The computer system according to claim 2,
wherein the interrupt mode setting register includes one or more interrupt factors and the mode is set by setting one or more of the one or more interrupt factors.

4. The computer system according to claim 1,
wherein the interrupt controller includes an interrupt priority level setting register configured to set a priority level,
wherein the CPU includes a status register configured to set a level for masking an interrupt request, and
wherein, if a set priority level exceeds a set level for masking the interrupt request of the CPU, the CPU becomes capable of accepting the interrupt.

5. The computer system according to claim 1, further comprising:
a comparator for mutually comparing outputs of the CPUs,
wherein the computer system is configured to switch between
a performance mode of executing mutually different processes by the CPUs, respectively, to improve performance; and
a safety mode of executing mutually the same processes by the CPUs and collating results by the comparator to detect failure, and
wherein the interrupt controller further includes an interrupt mode setting register configured to set an operation mode to be executed, the operation mode being the performance mode or the safety mode.

6. The computer system according to claim 5,
wherein, if the interrupt mode setting register is set to the performance mode when the mode being currently executed is the performance mode, a request of the interrupt is output to the CPU.

7. The computer system according to claim 5,
wherein, if the interrupt mode setting register is set to the safety mode when the mode being currently executed is the performance mode, a request of the interrupt is prevented from being output to the CPU, and, when all of the CPUs to be interrupted become acceptable, the process of the CPU is stopped, the operation mode is switched from the performance mode to the safety mode, and the interrupt request is output to the CPU.

8. The computer system according to claim 5,
wherein, if the interrupt mode setting register is set to the performance mode when the mode being currently executed is the safety mode, a request of the interrupt is prevented from being output to the CPU, and, when the CPUs to be interrupted become acceptable, the process of the CPU is stopped, the operation mode is switched from the safety mode to the performance mode, and the interrupt request is output to the CPU.

9. The computer system according to claim 5,
wherein, in a situation where the interrupt mode setting register is set to the safety mode when the mode being currently executed is the safety mode, if all of the CPUs to be interrupted are acceptable, a request of the interrupt is output to the CPU, and wherein, in the other situations, the interrupt request is not output.

10. The computer system according to claim 6,
wherein the interrupt controller includes an interrupt priority level setting register configured to set a priority level,
wherein the CPU includes a status register configured to set a level for masking an interrupt request, and
wherein, if a set priority level of the interrupt factor exceeds a set level for masking the interrupt request of the CPU, the CPU becomes capable of accepting an interrupt.

11. The computer system according to claim 10,
wherein the status register of the CPU includes a mode switching bit indicating whether a mode switching has been carried out or not,
wherein the mode switching bit is:
set to a value indicating that the mode switching has been carried out when the mode switching is carried out; and
set to a value indicating that the mode switching has not been carried out when the interrupt is accepted, and
wherein, if the mode switching bit has the value indicating that the mode switching has been carried out when recovered from the interrupt, the mode switching is executed.

* * * * *